Nov. 16, 1948.   O. W. GREENE   2,454,160
CORROSION RESISTING VALVE
Filed Aug. 31, 1943   5 Sheets-Sheet 2
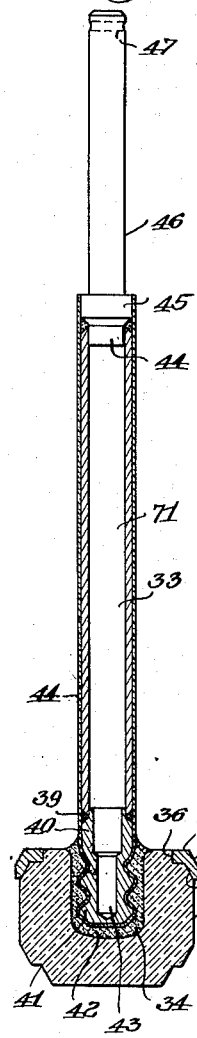
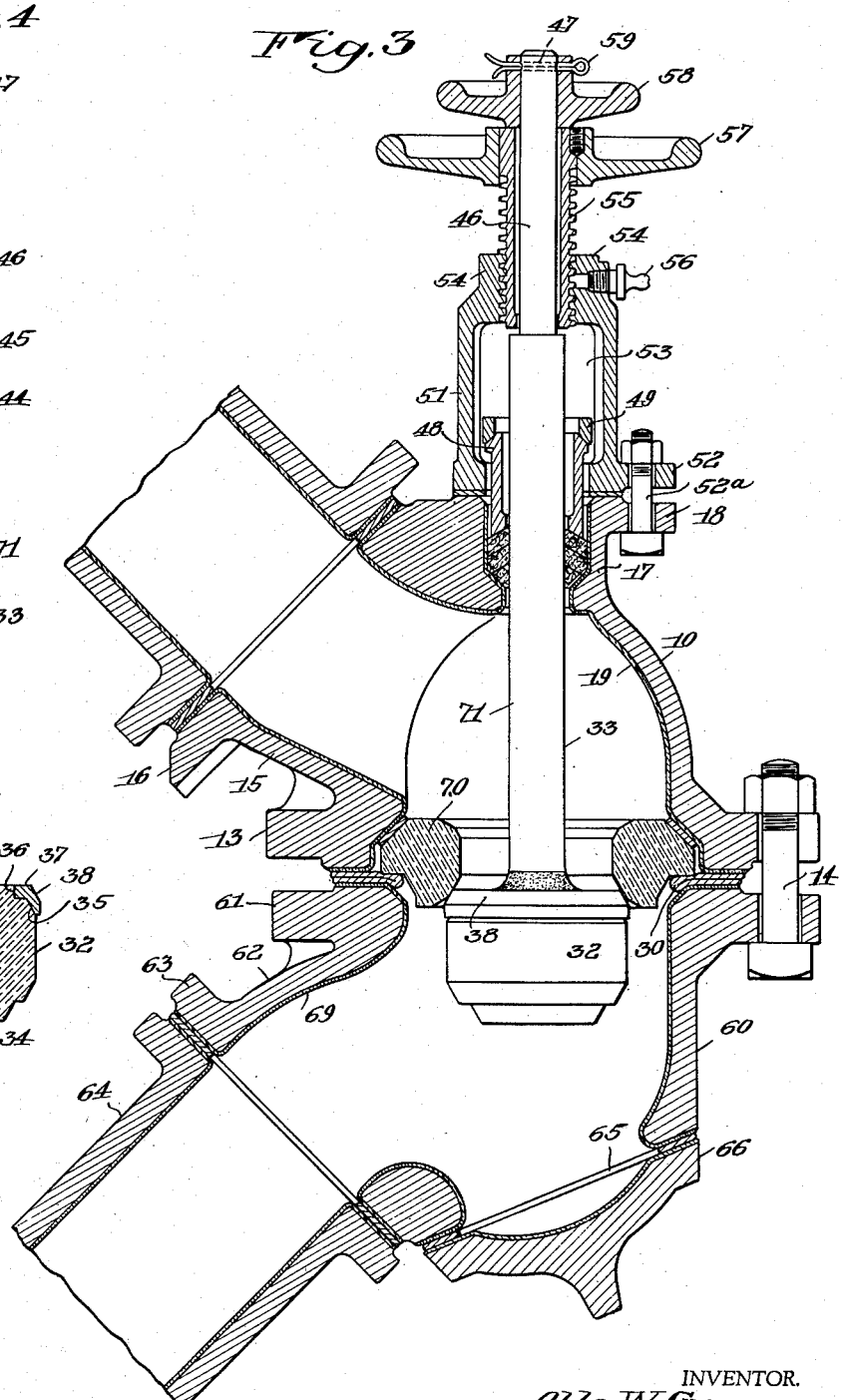
INVENTOR.
Otto W. Greene
BY Cumpston & Shepard
his Attorneys Nov. 16, 1948.  O. W. GREENE  2,454,160
CORROSION RESISTING VALVE
Filed Aug. 31, 1943  5 Sheets-Sheet 3
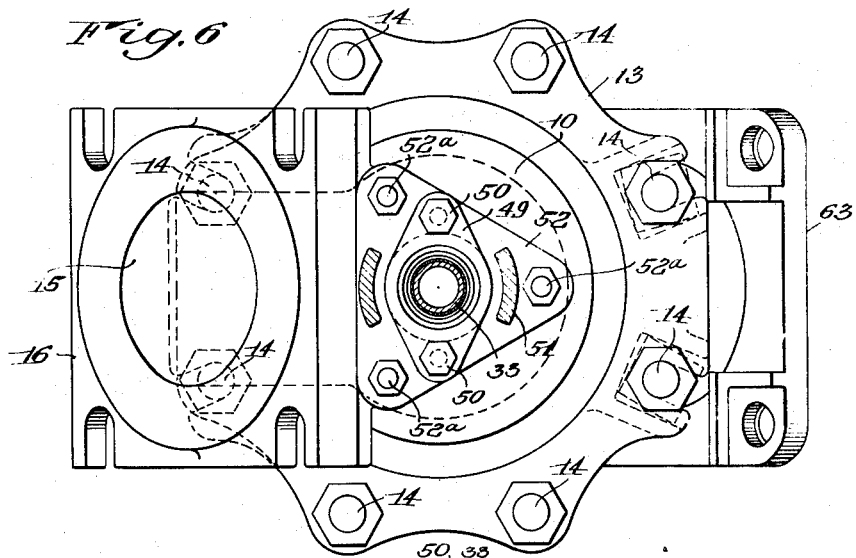
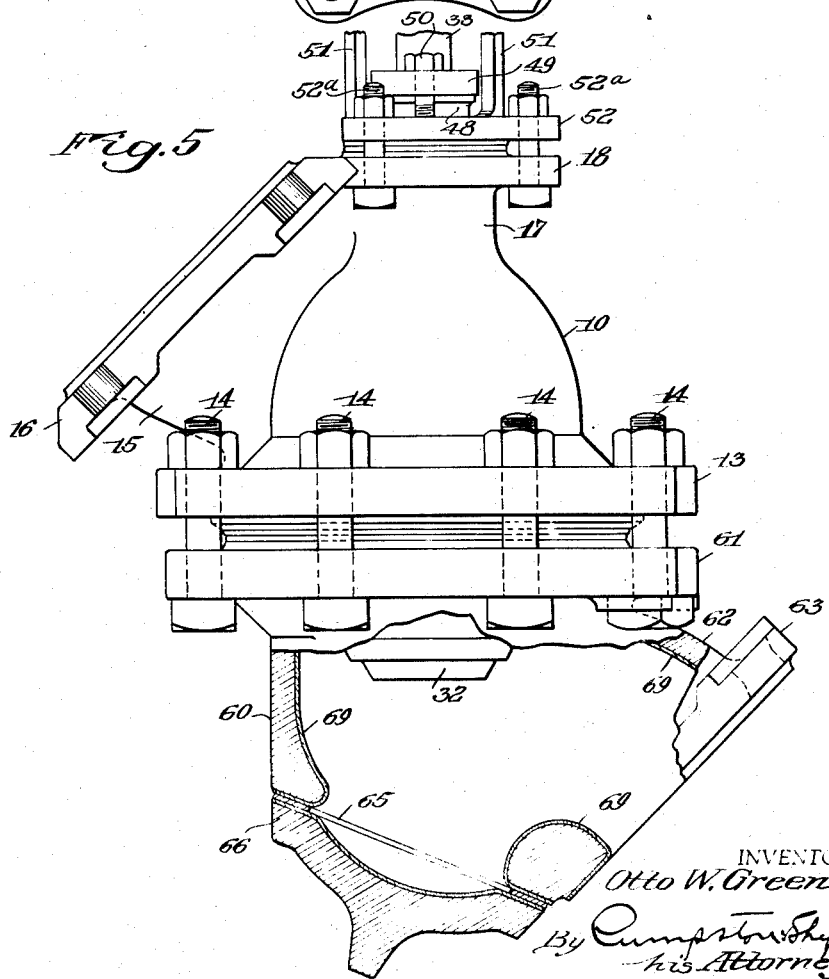
INVENTOR.
Otto W. Greene
By Cumpston Shepard
his Attorneys

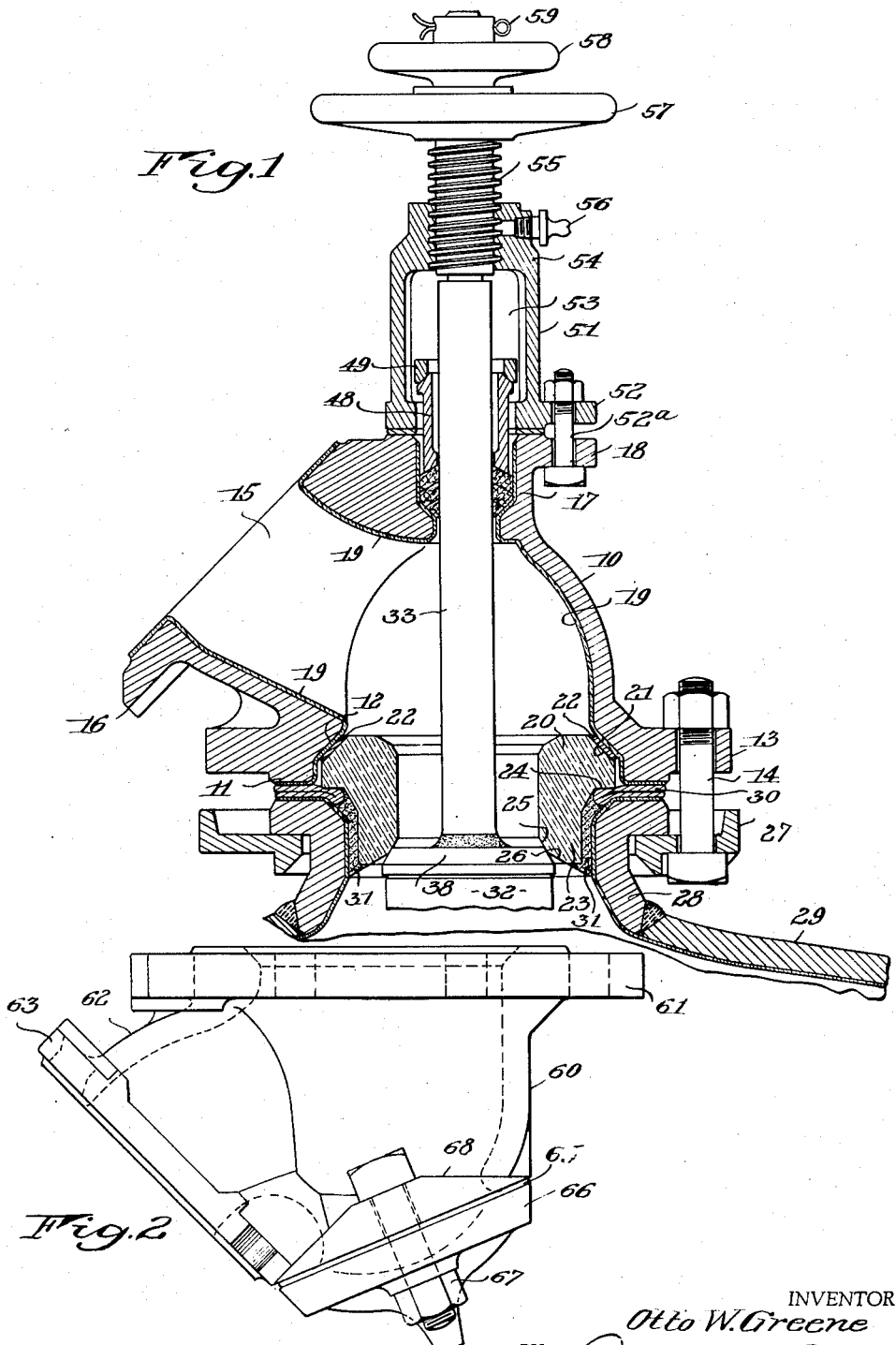

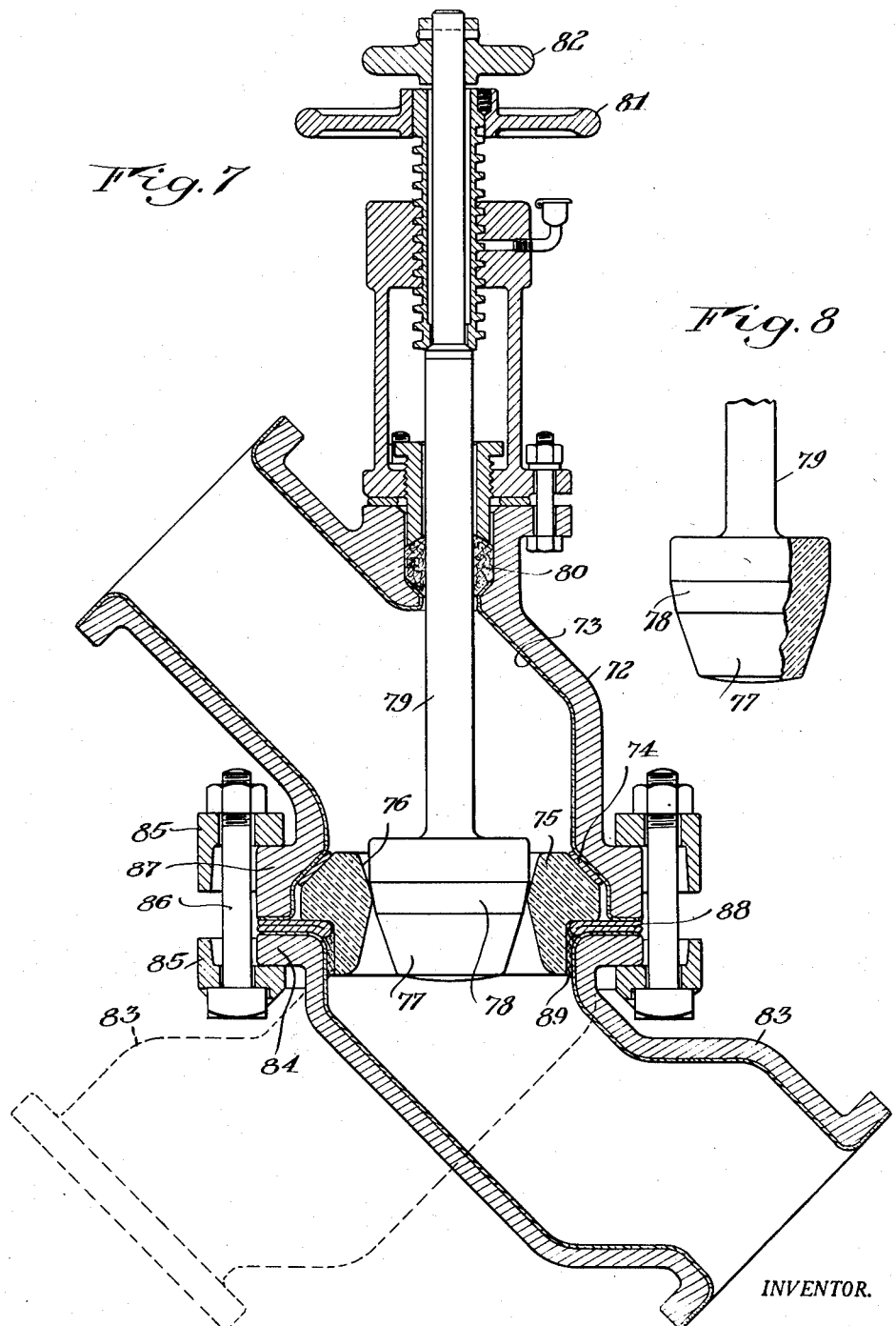

Nov. 16, 1948.    O. W. GREENE    2,454,160
CORROSION RESISTING VALVE
Filed Aug. 31, 1943    5 Sheets-Sheet 5
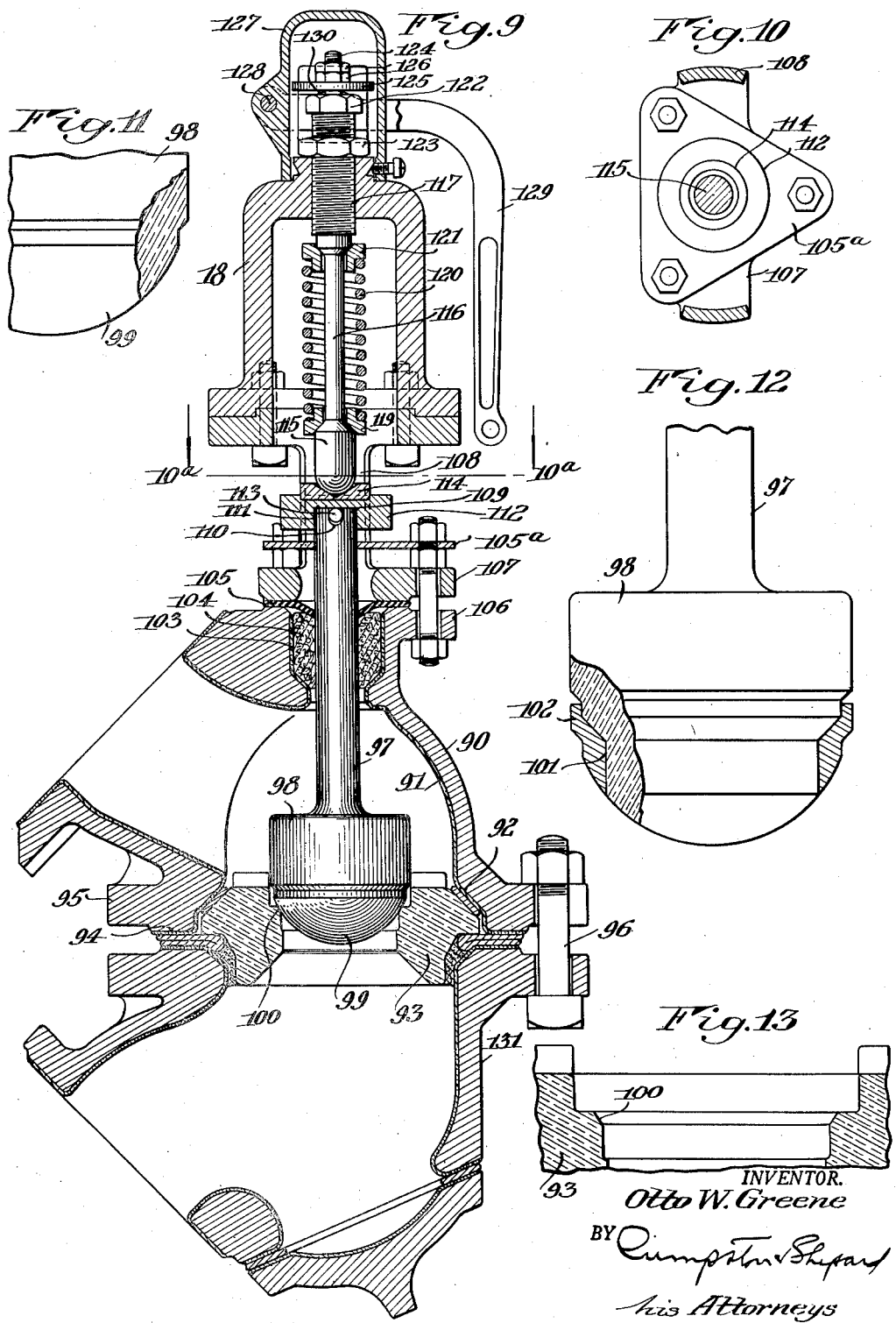
INVENTOR.
Otto W. Greene
BY
his Attorneys Patented Nov. 16, 1948

2,454,160

UNITED STATES PATENT OFFICE 2,454,160

CORROSION RESISTING VALVE

Otto W. Greene, Brighton, N. Y., assignor to The Pfaudler Co., Rochester, N. Y., a corporation of New York Application August 31, 1943, Serial No. 500,669

6 Claims. (Cl. 251—158)

1

This invention relates to valves which are rendered substantially non-corrosive by the use of materials capable of resisting chemical attack, for the purpose of meeting the severe requirements of fields involving the use of acids and other chemicals tending to corrode metallic materials. It has been proposed heretofore to meet such requirements with valves of standard constructions except for the substitution, at the parts subjected to chemical attack, of alloys of a character more or less resistant to attack. Such constructions have been open to the objections that they are not sufficiently resistant to corrosion, are not so designed as to be readily reground when corroded to reseat the valve, and have depended for tight closure upon excessive pressure between the valve and valve seat, so as to restrict the materials available for such parts.

It has been attempted, on the other hand, to construct such valves of ceramic materials upon which chemicals have little effect, but such attempts have been open to the objection that these materials having limited strength except in compression, are very brittle, when formed in thin sections, so as to require the resort to objectionably thick walls and heavy, cumbersome designs. Furthermore, when ceramic materials are employed in non-uniform sections, they are excessively frail as against stresses resulting from changes in temperature alone, as well as stresses commonly imposed in operation, by connection with pipe lines, and the like.

One object of the invention, therefore, is to provide a valve for the above purposes in which the parts exposed to chemical attack are made of materials having the chemical resistance of ceramic compositions, but in which the body portion or housing is made with sections of substantially uniform and practicable thickness and having the strength of metal materials.

Another object is to provide a valve of the above character having a metal housing to provide the desired strength, and with all the metal surfaces lined with vitreous enamel, and with a ceramic valve head and seat, to provide a high degree of resistance to reaction with chemicals.

Another object is to provide a valve of the above type having a ceramic valve head and seat ring with uniform cross sectional dimensions and so constructed and arranged that the stresses imposed thereon by temperature changes and in operation are limited to stresses of a compressive nature.

Another object is to afford a unitary, strong and durable valve head and stem in which the

2 valve head may be readily equipped with interchangeable seating surfaces of various materials for various uses.

Another object is to provide such a valve having a construction affording ready access to the valve head, valve stem and seat, for convenient repair or replacement.

Another object is to provide such a valve with means by which the seating surfaces may be readily cleaned and lightly reground without removal from the housing and without detaching the valve housing from its connections.

Another object is the provision of a valve of the above type having its inlet and outlet connections, valve parts, and operating means all contained in a single housing adapted for assembly directly with the outlet of a container or other conducting means, to serve as a flush valve.

A further object is to provide such a valve having one of its housing parts arranged for adjustment to one position to form an angle valve, and to another position to form a straight line valve.

A further object is to provide a valve having one housing part containing the outlet connection, valve parts and operating means therefor, and a second housing part adjustable to one position to form an angle valve, and to another position to form a straight line valve, with standard dimensions and flange connections in each of said adjustments.

Still another object is the provision of a corrosion resisting valve having the above advantages and capable of various adaptations, as for use, for example, as a flush outlet valve, a throttle valve, a safety valve and the like.

To these and other ends the invention resides in certain improvements and combinations of parts, all as will be hereinafter more fully described, the novel features being pointed out in the claims at the end of the specification.

In the drawings:

Fig. 1 is a central, sectional view of a valve embodying the present invention, and showing the same applied in flush relation and at a 45° angle to the flanged outlet of a liquid container or tank;

Fig. 2 is a plan view of an additional housing part for adapting the valve shown in Fig. 1 to form either a 90° angle, or straight line valve, for connection with a pipe line, or other conduit;

Fig. 3 is a central, sectional view showing the valve parts of Figs. 1 and 2 assembled to form an angle valve for a pipe line;

Fig. 4 is a longitudinal, sectional view of the valve head and stem;

Fig. 5 is a plan view partly in section, showing the valve parts of Fig. 3 adjusted to form a straight line valve;

Fig. 6 is a top plan view of the parts shown in Fig. 5;

Fig. 7 is a central, sectional view showing the adaptation of the invention to a throttle type valve capable of being arranged as either a 90° angle valve, or a straight line valve;

Fig. 8 is a detail view, partly in section, of the valve head of Fig. 7;

Fig. 9 is a central, sectional view showing the application of the invention to a safety type valve adapted for use as either a 90° angle or straight line valve;

Fig. 10 is a sectional detail view on the line 10a—10a in Fig. 9;

Fig. 11 is an enlarged detail view, partly in section and broken away of the valve head shown in Fig. 9;

Fig. 12 is an enlarged detail view, partly in section, of a modified valve head, and Fig. 13 is an enlarged sectional detail view of the corresponding valve seat ring.

The invention is herein disclosed, by way of illustration, in a preferred embodiment of the same and in several adaptations thereof to different uses. In one adaptation, the inlet and outlet connections, valve head and seat, and operating means therefor are combined in a single body or housing part having a flanged open side and adapted for application directly to the flanged outlet of a tank or other chemical container, to serve as a flush outlet valve. Referring more particularly to Fig. 1 of the drawings, such housing part is indicated generally at 10, as an iron or steel casting of the relatively thin and uniform cross-sectional dimensions commonly employed in standard metal valves. Housing part 10 has an inlet opening at one side 11 and is formed about said opening with an annular shoulder 12, which is inclined or flared outwardly toward said opening, preferably at an angle to the axis of the opening of about 45°, as shown, to support the valve seat, as hereafter described. The housing is formed about said shoulder and open side with a flange 13, corresponding, in the present instance, to a standard 4" pipe flange provided with eight holes for attaching bolts 14. Housing 10 comprises also a 3" outlet passage 15 having a flange 16 adapted for connection with a standard 3" pipe line flange. At 17 on the housing is a valve stem stuffing box terminating in a flange 18, as hereafter described. The inner surfaces of housing part 10 are coated with a corrosion-resisting material, such as the known vitreous, or glass lining material, as indicated at 19.

The valve seat is provided on a separately formed annular ring 20 of ceramic material, preferably a good quality of porcelain, with a surface 21 flared outwardly or beveled at substantially the same angle as and seated on the shoulder 12 of the housing, a thin seating gasket of sheet packing 22 being preferably interposed to form a tight joint. Ring 20 is preferably of substantial and strong proportions, as shown, with a sleeve portion 23 projecting outwardly somewhat beyond the flanged opening of housing 10, this projecting portion having an extrenal annular recess 24 therein by which its outer diameter is reduced to less than that of the flanged opening of the housing. Projecting portion 23 has an outwardly flared or beveled portion 25 which forms the valve seat beyond which it has an outwardly flared end 26 adapted to be received within the conducting means with which part 10 is connected. It will be noted that the seat ring 20 has uniform cross-sectional dimensions to promote uniform expansion and contraction under variations in temperature.

In the adaptation of the invention shown in Fig. 1, housing part 10 is associated directly with the outlet of a tank or other container to serve as a flush outlet valve. To this end, housing part 10 has its flange 13 connected by the bolts 14 with the flange 27 of the outlet 28 of the container the body wall of which is indicated at 29. Interposed between flanges 13 and 27 is a gasket 30, of asbestos, rubber or the like. The projecting end 23 of the porcelain seat ring exends, as shown, within the outlet 28 of the tank, with a space therebetween which is preferably filled with any known or suitable, chemically resistant cement 31, to form a tight joint and a smooth and flush outflow connection with the valve seat, particularly where the tank is arranged with its outlet at its bottom to drain it.

The valve head preferably comprises a body 32 of ceramic material, such as a good quality of porcelain, mounted on a tubular metal valve stem 33. The valve head, in this adaptation of the invention, is located outside the valve seat and is preferably of uniform cross-sectional dimensions and strong proportions and thickness, as shown, with a recess 34, Fig. 4, for receiving the valve stem. It is well adapted to resist thermal expansion and contraction and operating stresses and is preferably formed with an annular flared or beveled surface 35 capable of cooperating directly with the valve seat 25. Preferably, the head has also an annular recess 36 in which is detachably seated a ring 37 of suitable seating material, such, for example, as hard rubber, synthetic plastics, or lead, or other metal, having a high chemical resistance. Ring 37 has an inwardly flared or beveled surface 38 adapted to seat against the surface 25 of the seat ring 20. Ring 37 has a pressed fit with the annular recess in the valve head, but may be replaced by a ring of the same or another material, as particular uses may require, or may be omitted altogether, so that the surface 35 of the porcelain head contacts directly with the seat ring 20. For such purposes, this ring 37 of the head is readily accessible from the exterior of the housing and without disconnecting the housing, as hereafter described.

The valve stem 33 (Fig. 4) is preferably welded as at 39 to an end piece 40, formed externally with anchoring grooves 41. The end 40 is inserted within the recess 34 of the valve head, as shown, and secured in place by an interposed filling of cement 42 interlocking with the grooves 41, as well understood in the art. End piece 40 is preferably hollowed out as at 43, to maintain a substantially uniform thickness in the walls of the tubular stem, which is covered with a vitreous enamel or glass coating 44, to protect it against chemical attack. At its other end, the stem is telescopically fitted and attached to the reduced portion 44 of an enlarged end 45 of a solid, unglazed operating rod 46, to which are attached the means for operating the stem.

The valve stem is mounted in the stuffing box 17 containing suitable packing, as shown, and having the flange 18. The gland or follower sleeve 48 is actuated by a bar 49 pressed downwardly by bolts 50, Fig. 6, threaded into the base of the valve bonnet described below.

Means are provided for operating the valve stem, comprising means for moving it longitudinally to open and close the valve, and also means for rotating it to clean or lightly grind the seating surfaces. Such operating means comprises a valve bonnet 51 (Fig. 3), embracing the valve stem and having a lower triangular flange 52 (Fig. 6) bolted to the flange 18 of the stuffing box, as by bolts 52a. The bonnet has side openings 53 (Fig. 3) for access to the packing and an upper head 54 with a threaded central bore in which is threadedly engaged a sleeve 55 turning loosely on the operating extension 46 of the stem. At 56 is a fitting for lubricating the threaded surfaces. Fixed on the upper end of sleeve 55 is a hand wheel 57, preferably with a solid or circumferentially continuous and smooth flange, to prevent forcible engagement and turning by a tool. Above the sleeve 55 is a similar but smaller hand wheel 58 keyed to the operating extension of the stem by means of a shear pin 59 inserted in the terminal opening 47 of the stem extension. Sleeve 55 rotatably embraces the stem extension 46 between its shoulder 45 and wheel 58.

It will be apparent from the above description that, by turning wheel 57, threaded sleeve 55 is turned and moved longitudinally, to effect longitudinal movement of the sleeve stem, to open and close the valve. The continuous construction of hand wheel 57 makes it difficult to apply a wrench or other tool, thus tending to limit the force applied to the ceramic valve head and seat. By turning the upper hand wheel 58, rotary motion, only, is imparted to the stem and valve head in any position to which they may be adjusted longitudinally by means of the other hand wheel 57. In ordinary use, the valve is opened and closed by turning hand wheel 57 alone, but hand wheel 58 is occasionally rotated for the purpose of rotating the valve head, while in light engagement with its seat ring, to clean from the seating surfaces any accumulation of grit or other foreign substances, as well as to lightly grind such surfaces to maintain them in accurately mating, liquid tight engagement with each other. The applied rotary force is limited by the manual actuation of small wheel 58 and the strength of the shear pin 59.

With the valve housing part 10 and its associated parts remaining fixed to the flange outlet of a container, as shown in Fig. 1, access may be had from the container to the valve head and seat to clean the same or replace the special rings 38 on the valve body. If desired, shear pin 59 may be removed from the stem, along with the bonnet and associated parts, including the packing from the stuffing box, if necessary, and the stem may then be removed through the container for replacement or repair. By detaching the housing part 10 from the container flange, seat ring 20 may be removed for repair or replacement.

It will be apparent from the above described construction that pipe line stresses resulting from temperature changes, or the drawing together of joints, are taken by the metal body portion only, without reaching the ceramic valve head and seat elements. The latter are so shaped, associated and arranged as to receive only compressive stresses which these ceramic materials, of high compressive strength, are well adapted to sustain without injury.

Thus the seat ring 20 is spaced from the surfaces of the housing parts 10 and 28, as shown, and held between the resilient sheet packing 22 on the inclined shoulder 12 of housing part 10 and the thick resilient gasket 30 overlying the inclined shoulder of the container outlet 28 so that any pressure applied to the porcelain ring seat by clamping together the flanges 13 and 27 is resiliently limited and applied normally to its surfaces and is of the compressive nature which the porcelain material is adapted to withstand. Excessive pressure between the flanges at any part of the periphery tends to force that part of the ring inwardly and equalize the lateral pressure. Such minor lateral pressure against the ring is directed compressively inwardly against its convex periphery, in which direction also the ring is relatively strong. The moderate seating pressure of the valve head applied to surface 25 of the ring tends merely to compress it against the opposite, substantially parallel surface of shoulder 12, so that the stresses to which the seat ring are subjected are substantially limited to those of a compressive character alone. Likewise, pressure applied to the ceramic valve head 32, in closing it against its seat, is mainly a compressive force applied normally to its seating surfaces and which it is well adapted to sustain. It will be apparent also that all of the surfaces of the valve housing and its parts, which are subjected to contact with chemical contents, are composed of ceramic material which is highly resistant to chemical attack, so that the valve is completely protected.

In the manufacture of the valve, the seat supporting shoulder 12 is machined in precise conformity with the axis of the stuffing box and valve bonnet with which the stem axis coincides, and the stem assembly is manufactured by a special method to maintain its alinement with the stuffing box and seat. The high temperature at which its vitreous coating is applied tends in some cases to produce warpage in the stem and, to guard against such defects, the porcelain head is assembled and cemented to one end of the coated stem in a fixture. After the cement is dried, the head and the uncoated opposite end 46 of the stem are ground and machined in one position, concentric with the coated intermediate portion of the stem which is mounted in the stuffing box. This provides for removal of all distortions so that when the stem assembly is finished and installed in the valve, its porcelain head is positioned concentrically with the seat so that only a slight grinding of the head into the seat is required in final assembly.

The above described valve assembly in housing part 10 may be similarly applied, for example, directly to a standard 4" flange of the lateral connection of a T section of a pipe, or of any other conduit to afford a 45° angle connection, and the invention further comprises a second housing part for adapting the above valve assembly for use as either a 90° angle valve, or a straight line valve, as may be required. Such second housing part comprises a metal section 60 (Figs. 2, 3 and 5), having a 4" flange 61 adapted to be bolted to flange 13 of the housing part 10 with its axis coinciding with the axis of the valve stem. Housing part 60 is formed with a lateral inlet portion 62, having a 3" flange 63 of generally rectangular shape, provided with bolt holes for attachment to the flange of a standard pipe section 64, Fig. 3. Inlet 62 and flange 63 preferably have their axis arranged to intersect the axis of the valve stem at an angle of approximately 45°, as in the case of the outlet 15 of part 10, and flanges 63 and 16 are preferably at such a distance from the axis of the valve stem that the valve with its inlet and outlet connections has the same dimensions from center line to flange face, as standard pipe elbows and other 90° angle sections, so as to be adapted for convenient use in any standard pipe line.

Housing part 60 may also be adjusted, relative to housing part 10, to form a straight line valve, by changing it from the position shown in Fig. 3, through 180° to the position shown in Fig. 5, where it will be seen that the axis of inlet port 62 is alined with the axis of outlet 15 of part 10. Such adjustability of part 60 makes the same valve conveniently and economically adaptable to various uses and associations.

The above described construction of housing part 60 affords the further advantage of increasing the accessibility of the interior parts of the valve. To this end the portion of housing part 60 lying substantially in line with the projected axis of the valve stem, is formed with a circular opening 65 having a diameter somewhat greater than the diameter of the valve body 32. Opening 65 is normally closed by a cover plate 66 secured in place by bolts as 67, Fig. 2, passing through the cover and through flange portions 68 at the sides of the opening. In either of the described positions of adjustment of the housing part 60, and while the valve remains connected in the pipe line, cover 66 may be removed and access thus obtained to the valve head and seat ring for inspecting or cleaning the same, replacing the ring 38 of the valve head, or the like. Or, by removing the operating means, bonnet and packing of the valve stem, as already described, so as to free the stem, it may be entirely withdrawn, with the valve head, through opening 65 for repair or replacement, as required. By this means of entry on one side of the valve seat, and by entry, if necessary, through the outlet 15 on the opposite side of the seat, the interior parts of the valve are rendered conveniently accessible for the purposes described.

The interior surfaces of housing part 60, including cover plate 66 and the flange connections, are preferably covered with any known or suitable vitreous enamel or glass lining 69, to completely protect the same against chemical attack, as described above in connection with the housing part 10 and its associated elements. The latter remain the same whether applied directly to a container outlet, as in Fig. 1, or whether employed in conjunction with the housing part 60 for adaptation to use as an angle or straight line valve, as in Figs. 3 and 5, except that, when used in connection with the housing part 60, it is preferred to employ a valve seat ring 70 projecting to a lesser distance beyond the flange 13, as shown in Fig. 3, thereby locating the valve body nearer to the housing part 10, to preserve ample clearance between the valve head and the walls of the housing part 60 in the open position of the valve. With such modification of the dimensions of the seat ring, and the position of the valve head, the valve stem 71 is correspondingly shorter.

The application of the invention to a throttle type valve is illustrated in Figs. 7 and 8. The valve there shown is generally similar in the construction and arrangement of parts to those shown in Figs. 3 to 6, inclusive, comprising a main casing or body portion 72 having a vitreous lining 73. The housing is parted and flanged, as before, adjacent the plane of the valve seat and formed with an inclined shoulder 74 for a porcelain seat ring 75 having the characteristics described above, except that it is arranged with its inclined seating surface 76 facing inwardly of the housing. The valve head is a ceramic body 77 having a seating surface 78 for cooperation with the ring by a movement of the stem 79 inwardly of the housing. The stem and head otherwise have the construction described above and illustrated in Fig. 4, and the stem is similarly mounted for rotary and reciprocating movement in a stuffing box 80. Similar means are provided on the bonnet, operated by a hand wheel 81, for reciprocating the stem longitudinally, and a similar wheel 82 is provided on the stem for rotating it to regrind the seating surfaces.

At 83 is shown a similar auxiliary housing part for adapting the valve of Fig. 7 to serve either as a 90° angle valve or a straight line valve, as desired. Housing part 83 has a flange 84 clamped as by means of split rings 85 and bolts 86 to the flange 87 of the main housing portion 72. Interposed between the flanges is a gasket 88, as before, and, after the desired adjustment of housing part 83, its connection with the seat ring 75 is cemented as at 89, as described above, to insure a flush connection. The position of housing portion 83 shown in full lines corresponds to a straight line arrangement of the valve, while the dotted line position for portion 83 corresponds to a 90° angle arrangement, relative to the outlet on the main portion 72.

As further illustrating the wide application of the principles of the invention, they are shown in Figs. 9 to 13, inclusive, as embodied in a safety or pop valve, comprising a main housing part 90 of the same general construction already described, having a vitreous protective lining 91. The housing is formed as before with a 45° shoulder 92, compressively supporting a porcelain seat ring 93 of uniform cross section, as described. The housing is parted, as at 94, adjacent the plane of the seat and the opening so formed is provided with a flange 95 having the usual holes for bolts 96 for attachment to a flanged tank outlet, a pipe, or other connection, as desired.

This modification is equipped with an enameled metal valve stem 97 of the character described having fixed on its end a porcelain valve head 98 of the same general construction as in the previous modifications, except that it is preferred, in this instance, to form the seating surface 99 of the valve head and the cooperating surface 100 of the seat ring as portions of spherical surfaces, affording, in effect, a ball seat valve, the accurate seating of which is not affected by small variations in the angularity of the valve stem. Instead of forming the spherical seating surface on the porcelain head, the head may be suitably recessed as at 101, Fig. 12, and provided with an attached seating ring 102 of some special seat material as described above.

Prior safety valves have commonly been subject to the defect of excessive frictional resistance in the packing for the stem which has caused it to stick before opening and also delay its closing. I have found that this difficulty may be overcome by filling the stuffing box 103 with a loose barrier packing 104, preferably loose asbestos packing, the vitreous lining of the housing being carried up through the stuffing box, as shown. To seal the joint about the stem, as well as to retain the loose packing in the stuffing box, a flexible diaphragm 105 is secured on the top of the stuffing box, as by clamping it between the flanged outlet 106 of the housing and the bottom flange 107 of the bonnet 108. Diaphragm 105 is preferably formed of some suitable rubber-like material, such as flexible natural or artificial rubber, and has an opening closely embracing the enameled valve stem, under elastic tension, so as to seal the joint about the stem and hold in the loose packing. The diaphragm flexes as the stem moves and so moves with it, being shown in the drawing inclined downwardly in following the downward seating motion of the stem. The loose asbestos packing 104 substantially retains the liquids and gases within the housing, while diaphragm 105 completes the seal and holds the loose packing in place, without any substantial frictional resistance to the movement of the stem. These packing parts provide a mounting for the stem, but it has been found preferably to provide additional means for more closely confining and guiding the stem, comprising preferably a metal plate 105a having an opening in which the stem is closely but loosely fitted, the plate being supported at its edges on the bonnet attaching bolts.

This modification also is provided with means for conveniently grinding in the valve parts, as well as regrinding the same while in operation. For this purpose, the upper end of the stem 109 is notched at 110 and seated in a recess 111 in a knurled disk or hand wheel 112, which has extended across its recess a rod 113 engaged in the slot 110 of the stem. Disk or wheel 112 is thus mounted on the top of the stem, for reciprocation therewith in the opening and closing of the valve and furnishes a means for manually rotating or oscillating the stem while lightly seated, to grind or regrind the valve parts.

Fitted in a shallow recess in the top of disk 112 is a second disk 114 having a recess in its upper side in which is rotatably seated the spherical lower end 115 of a spindle 116 slidably reciprocating at its upper end in an externally threaded sleeve 117. Sleeve 117 engages in a threaded opening in the top portion 118 of the bonnet. Riding on the enlarged lower end 115 of the spindle is a collar 119 forming a seat for the lower end of a compression spring 120 surrounding the spindle and bearing at its upper end against a collar 121 seated against the lower end of the sleeve 117. The upper end of sleeve has fixed thereon a nut-like head 122 by means of which the sleeve may be turned to adjust it longitudinally in the bonnet and so adjust the compressive force of the spring on the spindle, the disks 112 and 114 and on the upper end of the valve stem 97, for urging it toward its seat. At 123 is a lock nut for securing the sleeve in adjusted position.

Spindle 116 is extended upwardly beyond the sleeve 117 as at 124, and carries a laterally extending washer 125 secured on the spindle by means of lock nuts 126. A hood 127 on the top of the bonnet encloses the above parts and furnishes a pivotal support 128 for a lever 129 which is branched at its upper end so as to loosely surround the hood. Each lever branch is formed with a shoulder 130 engaging the under surface of the washer 125 so that when the lever is lifted, it lifts spindle 116 in sleeve 117 to relieve the valve stem from the downward pressure of spring 120 and permit it to be opened by the pressure in the valve housing. The valve stem thus has, as described above, a reciprocating motion and also a rotary motion imparted by the wheel 112 for grinding the valve parts. During transportation and storage of the valve, the lock nuts 126 may be screwed down to hold the spindle 116 up against the pressure of spring 120, so as to relieve the downward pressure of the valve head on the seat and for grinding in the valve parts, the lock nuts are backed off sufficiently to produce just enough downward pressure of the head on the seat, to give firm resistance to turning of the disk or wheel 112, the valve parts being previously wetted, as well understood in the art. In operation, the lock nuts 126 are backed off so that the full adjusted pressure of spring 120 is applied to the valve stem.

It will thus be seen that the valve parts may be ground in without removing the valve from the line, or loosening the bonnet from the valve, or detaching any parts other than the hood 127, and such grinding or regrinding of the parts may, in fact, be carried on in a practicable way while the valve remains in operation.

It will be noted also that the valve spring and all of the operating parts are located above the packing through which the glass coated stem extends and outside the housing so as to be free from attack by corrosive liquids and gases passing through the valve.

This modification also may be provided with an auxiliary angular housing part 131, as described in connection with the above modifications, for adapting the valve for use as either a 45° angle or a straight line valve.

The invention thus accomplishes its purposes by providing a valve housing having the strength and compactness of metallic material, combined with the full protection against corrosive attack supplied by interior surfaces of ceramic materials, the valve head, stem and seat elements being readily assembled and precisely alined in concentric relation and effectively protected in operation against other than limited compressive stresses such as the ceramic materials are well adapted to withstand. The valve head may be readily fitted with seating rings of various materials to adapt it for various uses. The parts within the housing are readily accessible for inspection, cleaning, or removal, and the tight seating of the mating surfaces may be maintained by light grinding treatment conveniently accomplished, from time to time, through rotation of the valve head in contact with its seat, by means of the separate operating wheels provided for that purpose, all without detaching any of the valve parts or the housing from its connections. The parts may be reground, in fact, while remaining in operation. The durable porcelain valve head and seat are thus capable of remaining in precise, liquid tight, mating relation with each other for indefinite periods of time.

While the invention has been disclosed by reference to the particular details and dimensions of a preferred embodiment, it is to be understood that such disclosure is intended to be merely illustrative, rather than by way of limitation, as it is contemplated that various modifications in the construction and arrangement of the parts will readily occur to those skilled in the art within the spirit of the invention and the scope of the appended claims.

I claim:

1. An acid-resistant valve comprising a metal housing having a vitreous enamel lining, said housing having a body part and a conducting part each formed with an opening at one side thereof and with a connecting flange about said opening, means for drawing said flanges into seating engagement with each other, said body part having its wall flared outwardly at said opening to a diameter larger than that of the opening of said conducting part and forming an inwardly inclined shoulder about said opening, a separately formed ceramic seat ring having an inwardly inclined surface lying against said shoulder and an abutment overlying the flange of said conducting part, sheet packing between said ring surface and shoulder, resilient rubber-like gasket means between said ring abutment and said flange of said conducting part for supporting said ring with an inwardly directed, resilient compressive force for centering the same in said opening, a metal valve stem mounted in said housing and having a vitreous enamel coating, a valve head on said stem having a surface of corrosion resisting material, and means for operating said stem to open and close said valve.

2. In a corrosion resisting valve, a metallic valve body having a conducting opening formed with an inwardly inclined shoulder, a connecting flange about said opening, a metallic conducting part having a connecting flange, said body and part having their inner surfaces lined with a vitreous enamel and said flanges having cooperating seating surfaces and means for drawing the same together, a metallic valve spindle movably mounted in said body and having a vitreous enamel coating, a valve head on said spindle having a surface of corrosion resisting material, a separately formed ceramic valve seat having an inwardly inclined shoulder cooperating with said body shoulder and also a surface for cooperation with said conducting part, said seat being spaced from said body and part, and resilient gasket material between said seat and part and between said seat and body shoulders for centering said seat relatively to said body opening and valve head by resilient pressure thereon between said part and said body shoulder and for limiting transmission to said seat of stresses occurring between said body and part.

3. In a corrosion resisting valve, a valve body having a conducting opening flared outwardly to form therein an inclined shoulder, a connecting flange about said opening, a conducting part having an opening of less diameter than said body opening to form therewith an annular recess, a connecting flange about said opening of said conducting part, said body and part having inner surfaces of corrosion resisting material and said flanges having cooperating seating surfaces and means for drawing the same together, a valve spindle and head movably mounted in said body and having surfaces of corrosion resisting material, a separately formed seat ring of corrosion resisting material having an outwardly extending flange located in said recess with one side thereof cooperating with said conducting part and the other side thereof inclined for cooperation with said body shoulder, said ring being spaced from said body and part, and resilient gasket material between said ring flange and said part and body shoulder for centering said ring relatively to said body opening and valve head by resilient pressure thereon applied by said means for drawing said flange seats together and for limiting the transmission to said seat of stresses occurring between said body and part.

4. In a corrosion resisting valve, a valve body having a conducting opening formed with an inwardly inclined shoulder, a connecting flange about said opening, a conducting part having a connecting flange, said body and part having inner surfaces of corrosion resisting material and said flanges having cooperating seating surfaces and means for drawing the same together, a separately formed valve seat of corrosion resisting material having an inwardly inclined shoulder cooperating with said body shoulder and also a surface for cooperation with said conducting part, said seat being spaced from said body and part, resilient gasket material between said seat and part and between said seat and body shoulders for centering said seat relatively to said body opening by resilient pressure applied by said means for drawing said flange seats together and for limiting the transmission to said valve seat of stresses occurring between said body and part, a valve spindle having a corrosion resisting surface mounted for movement in said body and extending through said seat, and a valve head on said spindle having a surface of corrosion resisting material for cooperation with said seat on the side thereof opposite said body shoulder, said conducting part being formed to provide clearance for the opening and closing movements of said valve head.

5. In a corrosion resisting valve, a valve body having an outwardly flared conducting opening provided with a connecting flange, a conducting part having an opening of less diameter than said flared body opening to form therewith an annular recess and provided with a connecting flange, said body and conducting part having inner surfaces of corrosion resisting material and said flanges having cooperating seating surfaces and means for drawing the same together, a separately formed seat ring of corrosion resisting material located in said recess and having a sleeve extending into the opening of said conducting part, resilient gasket material separating said ring from said part and resiliently supporting said ring in said recess, a valve spindle having a corrosion resisting surface mounted for movement in said body and extending through said ring, and a valve head on said spindle having a surface of corrosion resisting material for cooperation with said ring sleeve, said conducting part being formed to provide clearance for the opening and closing movements of said valve head.

6. In a corrosion resisting valve, a metal housing having a corrosion resisting lining and parted transversely of the flow passage therethrough to provide a body part and a conducting part, each of said parts having an opening provided with a connecting flange, said body part having an inwardly inclined shoulder therein about said opening, one of said housing parts having an outlet and the other having an inlet each arranged with its axis at an angle of 45° with said connecting flanges, means for drawing said connecting flanges into adjustable seated engagement with each other to form either a straight line valve or an angle valve, a separately formed seat ring of corrosion resisting material having surfaces cooperating with said shoulder and conducting part, resilient gasket means interposed between said ring and conducting part for centering said ring on said shoulder by an inwardly directed, resilient compressive force, a valve stem and valve head movably mounted in said body part and having corrosion resisting surfaces, and means for moving said stem to move said head toward and from said ring, said housing parts being formed to provide clearance for the said movements of said valve head.

OTTO W. GREENE.

REFERENCES CITED

The following references are of record in the file of this patent:

(Other references on following page)

UNITED STATES PATENTS

| Number | Name | Date |
|---|---|---|
| 240,369 | Blake | Apr. 19, 1881 |
| 613,024 | Byrne, Jr. | Oct. 25, 1898 |
| 746,402 | Sutton | Dec. 8, 1903 |
| 1,260,509 | Burge | Mar. 26, 1918 |
| 1,679,485 | Maxwell | Aug. 7, 1928 |
| 1,805,710 | Wilkins | May 19, 1931 |
| 1,840,904 | Julien | Jan. 12, 1932 |
| 1,875,574 | Duncan | Sept. 6, 1932 |
| 1,889,256 | Lipscomb | Nov. 29, 1932 |
| 1,947,257 | Fritz | Feb. 13, 1934 |
| 1,991,621 | Noll | Feb. 19, 1935 |
| 2,155,695 | Zinkil | Apr. 25, 1939 |

FOREIGN PATENTS

| Number | Country | Date |
|---|---|---|
| 1,483 | Great Britain | 1881 |